United States Patent [19]

Blackmon

[11] Patent Number: 5,754,415
[45] Date of Patent: May 19, 1998

[54] CONSTANT CURRENT FLYBACK POWER SUPPLY HAVING FORWARD CONVERTER MODE-CONFIGURED AUXILIARY SECONDARY WINDINGS PRODUCING CONSTANT VOLTAGE OUTPUT

[75] Inventor: Anthony D. Blackmon, Madison, Ala.

[73] Assignee: Adtran, Inc., Huntsville, Ala.

[21] Appl. No.: 804,805

[22] Filed: Feb. 24, 1997

[51] Int. Cl.$^6$ .................................................. H02M 3/335
[52] U.S. Cl. ............................................................ 363/21
[58] Field of Search ................................ 363/16, 20, 21; 323/267

[56] References Cited

U.S. PATENT DOCUMENTS

| | | | |
|---|---|---|---|
| 4,745,538 | 5/1988 | Cross et al. | 363/21 |
| 5,479,087 | 12/1995 | Wright | 323/267 |
| 5,528,482 | 6/1996 | Rozman | 363/21 |
| 5,534,768 | 7/1996 | Chacannes et al. | 323/267 |
| 5,555,494 | 9/1996 | Morris | 363/17 |

*Primary Examiner*—Matthew V. Nguyen
*Attorney, Agent, or Firm*—Charles E. Wands

[57] ABSTRACT

A constant current power supply contains a multimode transformer that supplies constant current power over a two or four wire link transporting telecommunication signals to a remote telecommunication unit. It also supplies a reduced magnitude, constant supply voltage for powering the circuitry of the constant current power supply itself. A primary transformer winding receives a pulse width-modulated voltage from a switched mode voltage generator, which is powered by a reduced magnitude, constant voltage derived from a first auxiliary, forward converter mode, secondary winding of the multimode transformer, through a first diode and a first inductor. The multimode transformer also includes a flyback mode secondary winding coupled to the two wire link and operative to deliver a prescribed constant current to the remote load circuit. A current detector circuit coupled in circuit with the two wire link monitors current supplied to the remote load from the flyback mode secondary winding, and controls the operation of the switched mode voltage generator, to maintain constant current flow to the remote load. Constant voltage power for the current detector is derived through a second diode and a second inductor from a second auxiliary, forward converter mode, secondary winding of the multimode transformer.

19 Claims, 1 Drawing Sheet

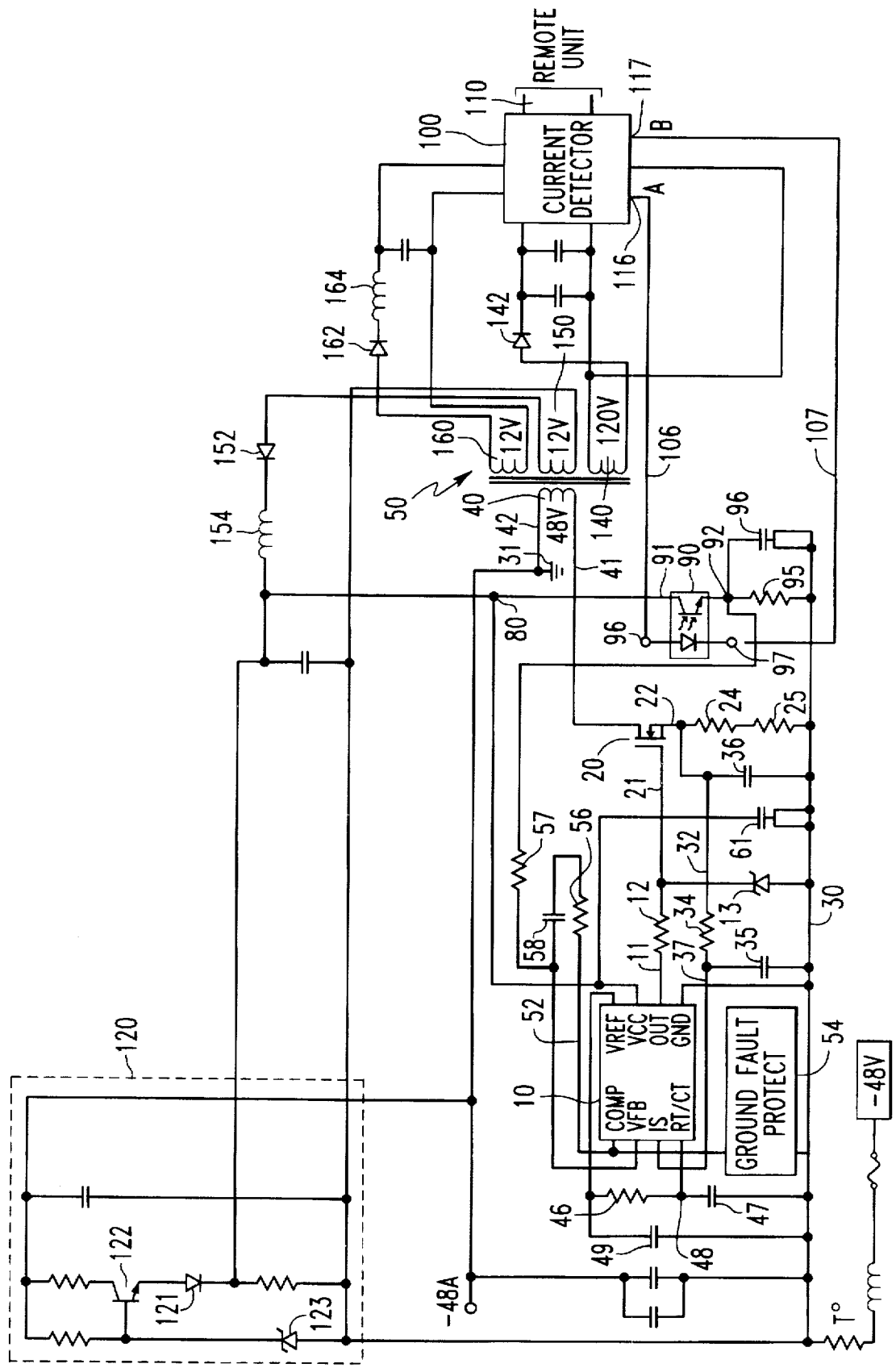

5,754,415

CONSTANT CURRENT FLYBACK POWER SUPPLY HAVING FORWARD CONVERTER MODE-CONFIGURED AUXILIARY SECONDARY WINDINGS PRODUCING CONSTANT VOLTAGE OUTPUT

FIELD OF THE INVENTION

The present invention relates in general to communication systems and networks and is particularly directed to a new and improved constant current power supply apparatus, that includes a multimode transformer winding arrangement having a primary winding coupled to receive a modulated voltage, a flyback mode secondary winding, which is configured to supply constant current power from a central office over a telecommunication two or four wire pair transporting telecommunication signals to a remote telecommunication unit, and a pair of auxiliary forward converter mode secondary windings, which are configured to supply a reduced magnitude constant supply voltage for powering the circuitry of the power supply itself.

BACKGROUND OF THE INVENTION

In an effort to ensure that the operation of a remote telecommunication unit being serviced from a central office is effectively independent of a locally available power source, it is common practice to power the remote unit from the central office using the same pair of wires that transport telecommunication signals between the central office and the remote unit. Where the power parameters for the remote site equipment require delivery of a constant current (typically on the order of 40–100 mA), then, in order for the voltage output by the upstream (central office) power supply to realize the desired constant current at the remote unit, it is necessary that the power supply voltage be adjustable (typically between 40 and 100 V), so as to accommodate variations in the physical separation or distance between the central office and the remote site.

It is customary practice to employ a (pulse width modulator-based) switch mode power supply operating off the 48V supply rail provided for the central office equipment. Because the components of the internal circuitry of the switch mode power supply require a voltage considerably less than the available 48 volt supply rail (e.g., on the order of 12V), lossy components, such as a resistor and Zener diode circuit, are typically employed to provide the requisite regulated reduced power, which is very inefficient.

An alternative, and more efficient, scheme such as that described in the Chavannes U.S. Pat. No. 5,534,768, is to employ an auxiliary winding of the main (flyback) transformer that is used to couple the switched (pulse width modulated) voltage to the telecommunication two wire pair serving the remote unit. For a given set of operational and separation parameters, the turns ratio of the auxiliary winding of the flyback transformer is defined so as to effectively tap off a prescribed fraction of the relatively large voltage required to supply constant current power to the remote unit. While such a scheme is satisfactory for one set of parameters, it will not maintain a constant current at the remote unit, if the distance between the remote unit and the central office is changed.

More particularly, in accordance with the operation of a flyback mode-configured transformer, during the first part of the switching cycle, the main power switch of the voltage modulator (usually a MOSFET) is conductive. As a consequence, energy is stored in the transformer core, and no energy is transferred to the secondary winding. During the second part of the switching cycle, the main switch is open and conduction through the transformer's primary winding is terminated. The resulting collapsing magnetic field induces current flow in the secondary windings of the transformer. The secondary winding voltage increases to a level sufficient to cause current flow, such that the flux in the transformer core is the same immediately after the opening of the switch as prior to its opening. The actual voltages reached by the secondary windings are controlled by voltage regulation circuitry and not by the turns ratio of the primary winding to the secondary; the voltage reached by the various secondary windings are locked to one another in accordance with their respective turns ratios.

As a result, if the main secondary winding is required to produce only half as much voltage as in another application, then the auxiliary windings will produce a similarly reduced voltage. As an example, if the distance between the remote unit and the central office is decreased, the magnitude of the switched voltage required to provide the same constant current to the remote equipment will also decrease. However, decreasing the magnitude of the switched power supply voltage will also reduce the magnitude of the voltage produced by the auxiliary winding of the flyback mode transformer for powering the internal circuitry of the switched voltage supply. To remedy this problem, it is standard practice to employ an additional switched mode power supply operating in a constant voltage configuration, with the output winding of its associated transformer used exclusively for providing its own supply voltage and that of the main pulse width modulated voltage generator. A major shortcoming of this approach is that it significantly increases circuit complexity and cost.

SUMMARY OF THE INVENTION

In accordance with the present invention, these problems are effectively solved by a constant current power supply apparatus containing a multimode transformer winding arrangement, which is configured to supply constant current power over a two or four wire link transporting telecommunication signals to a remote telecommunication unit, such as a repeater, and to supply a reduced magnitude, constant supply voltage for powering the circuitry of the constant current power supply itself.

For this purpose, the multimode transformer winding arrangement has a primary winding that is coupled to receive a pulse width-modulated voltage generated by a switched mode voltage generator. The switched mode voltage generator is powered by a relatively reduced magnitude, constant voltage derived from a first auxiliary, forward converter mode, secondary winding of the multimode transformer. This first auxiliary secondary winding is coupled through a first diode and a first inductor to the switched mode voltage generator.

The multimode transformer also includes a flyback mode secondary winding, which is coupled to the two or four wire link and is operative to deliver a prescribed constant current to the remote load circuit. A current detector circuit is coupled in circuit with the two wire link to the load and is operative to monitor the current being supplied to the load by way of the flyback mode secondary winding. The current detector circuit controls the operation of the switched mode voltage generator, so as to maintain a constant current flow to the remote load. Power for the current detector is derived through a second diode and a second inductor from a second auxiliary, forward converter mode, secondary winding of the multimode transformer, which also produces a relatively reduced magnitude, constant voltage.

Upon start-up, the switched mode voltage generator is initially powered by a relatively inefficient linear voltage regulator circuit, which produces the relatively reduced magnitude, constant voltage (e.g., 12V) required by the pulse width modulator. Once the switched mode voltage generator becomes operative, so that a constant voltage is generated by the first auxiliary, forward converter mode-configured secondary winding, this constant voltage is applied as a back bias control input to the linear voltage regulator, thereby turning off the linear regulator, and powering the switch mode regulator.

In operation, during the first portion of the switching cycle, as flux is stored in the main transformer's core for subsequent conversion into current in the flyback mode, secondary winding, it is also coupled directly into each of the first and second auxiliary secondary windings. The actual voltage produced by these auxiliary secondary windings is defined in accordance with the turns ratio coupled to the primary winding. The output voltage produced by each of the auxiliary secondary windings will remain at a prescribed constant value (e.g., 12V), irrespective of the voltage produced by the transformer's flyback secondary winding, in accordance with the value established by the current detector circuit to maintain a constant current flow via the two-wire path to the remote load.

Voltage pulses produced by the secondary auxiliary windings will be transformer ratio-coupled to the primary voltage, and can therefore be controlled to the correct amplitude by properly setting the turns ratios of the transformer's windings. The widths of these pulses will be controlled by the amount of constant current power delivered from the secondary flyback winding over the telecommunication link to the remote load. The pulse trains produced by a respective secondary auxiliary winding will be a series of pulses having a prescribed amplitude and width having an average value controlled by load conditions. Capacitors downstream of rectifier diodes are large relative to the loading of the auxiliary secondary windings, so that the auxiliary secondary windings operate in a peak hold mode and are not sensitive to pulse width.

BRIEF DESCRIPTION OF THE DRAWINGS

The single FIGURE diagrammatically illustrates a multimode transformer-based, constant current power supply apparatus in accordance with a preferred embodiment of the present invention.

DETAILED DESCRIPTION

The multimode transformer-based, constant current power supply apparatus according to the present invention is diagrammatically illustrated in the single FIGURE, as comprising a switched mode voltage generator (pulse width modulator (PWM)) 10, which is operative to produce a pulse width modulated (PWM) voltage output signal on an output line 11. Output line 11 is coupled through an oscillation-inhibiting resistor 12 to a controlled power switching device 20 (such as a power MOSFET), the current flow (source-drain) path of which is coupled in circuit between a (−48V) power supply reference bias line 30 and a first terminal 41 of a primary winding 40 of a main power transformer 50. A second terminal 42 of primary winding 40 is coupled to a reference (ground) terminal 31.

PWM 10 may comprise a commercially available fixed frequency current mode controller, having a prescribed controllable duty factor range. In the illustrated embodiment, PWM 10 provides a modulated (variable pulse width) output voltage over the pulse width modulation output line 11 through the oscillation-inhibiting resistor 12 to the gate terminals 21 of power MOSFET 20. Coupled between output line 11 and line 30 is a Zener diode 13, which is operative to prevent excessive transient voltages from being applied to the gate terminal 21 of the MOSFET 20.

With its drain-source path being coupled in circuit with the primary drive winding 40 of the main power transformer 50, MOSFET 20 is operative to controllably modulate or 'chop' the current through the main power transformer 50, and thereby controllably modulate the voltage across respective ones of a plurality of secondary windings, which include a first, flyback mode, secondary winding 140, and second and third auxiliary forward converter mode secondary windings 150 and 160, respectively. The modulated voltages across these secondary windings are rectified and filtered to provide respectively different magnitude output voltages, as will be described.

MOSFET 20 has its source terminal 22 coupled through a sense resistor, shown as a series-connected resistor pair 24-25, to bias reference line 30. Source terminal 22 is also coupled through a primary current sense filter comprised of a resistor 34 and capacitors 35 and 36 over a line 37 to a current sense input port IS of PWM 10. This filter circuit is operative to provide current limit level control and to filter out voltage overshoot associated with the inductance of the sense resistor pair 24-25.

The current sense input port IS of the PWM 10 serves as its the primary pulse width control input; namely, the width or duty cycle of the output pulse signal generated by the PWM 10 on its modulation output line 11 is dependent upon the voltage coupled to its current sense input port IS, based upon the primary winding current sensed via sense resistor pair 24-25. The operating frequency of the pulse width modulation output signal generated by the PWM 10 is defined by an RC time constant circuit comprised of a resistor 46 and a capacitor 47, coupled in circuit between reference voltage line 30 and a voltage reference (VREF) port of the PWM 10. The junction 48 of this RC time constant circuit is coupled to a frequency control input port RT/CT of PWM 10. A capacitor 49 provides a low AC impedance bypass path to the reference line 30 for the VREF port of the PWM 10.

PWM 10 has a compensation output port COMP coupled via line 52 to a ground fault protection circuit 54, which is operative, as necessary to limit current flow in paths other than the intended constant current path to the remote unit. These other paths might be unintentionally provided by a person's body and such current should be limited. The ground fault protection circuit 54 may comprise an opto-isolator coupled in circuit between the COMP port of the PWM 10 and reference line 30. The operation of the ground fault protection circuit 54 is responsive to the control output of a ground fault detection circuit (not shown). The compensation output port COMP of the PWM 10 is also coupled through coupling/biasing resistors 56 and 57 and capacitor 58 to output terminal 92 of an opto-isolator circuit 90. The output terminal 92 of opto-isolator circuit 90 serves as a pulse width modulation control node, and is coupled through parallel-connected resistor 95 and capacitor 96 to reference bias line 30. The junction between resistor 57 and coupling capacitor 58 is coupled to a voltage feedback port VFB of PWM 10. Voltage feedback port VFB provides a second control input to the PWM 10 (in addition to current sense input port IS) for controlling the modulated output waveform at its output port OUT.

PWM unit 10 is powered by a prescribed voltage (12V) applied from a constant voltage supply node 80 to its supply voltage input port (VCC), and a ground return line 30 to its ground terminal GND. This ground return is also capacitively coupled via capacitor 61 to its reference terminal (REF). Opto-isolator 90 has input terminals 96 and 97 coupled over respective lines 106 and 107 to output terminals 116 and 117 of a current detector circuit 100, of conventional construction, installed in a two-wire path (telecommunications link) 110 to a remote unit. Current detector 100 is powered by its own associated constant (12V) power supply derived from the secondary side of the main power transformer 50, as will be described, and is operative to generate an output representative of the current flow through the two-wire path 110.

As a start-up supply for the PWM 10, a conventional, relatively inefficient linear regulator circuit, shown at 120, is operative to apply a 12V output to the constant voltage supply node 80. Once a constant (12V) voltage is generated by the first forward converter-configured auxiliary secondary winding 150 of the main power transformer 50 and applied to node 80, that voltage is effective to back-bias a diode 121 coupled in circuit with the emitter of a transistor 122, so as to turn off the linear voltage regulator 120. A Zener diode 123 regulates the base voltage applied to transistor 122 to a prescribed value sufficient to meet the power up requirements of the VCC port of the PWM 10.

As pointed out above, the modulated voltages across the secondary windings of the main power transformer 50 are rectified and filtered to provide respectively different magnitude output voltages. In particular, flyback winding 140 operates in a conventional flyback mode to deliver a controlled constant current (as rectified by an output diode 142) over the two-wire path 110 to the remote unit being powered. Each of the secondary windings 150 and 160 is configured to supply a reduced magnitude constant (12V) supply voltage for powering the circuitry of the power supply itself. For this purpose, auxiliary secondary winding 150 is coupled through a first diode 152 and a first inductor 154 to the constant voltage supply node 80. Also, auxiliary secondary winding 160 is coupled through a second diode 162 and a second inductor 164 to the current detector circuit 100.

It will be recognized that a standard flyback mode secondary configuration does not employ an inductor, since the transformer normally provides its circuit function. However, since the auxiliary secondary windings 150 and 160 operate in forward converter mode, the transformer itself does not provide this function, so that inclusion of these auxiliary inductors is preferred. Although failure to include these inductors will result in a substantial reduction in the power efficiency of the auxiliary secondary windings, when compared to the main flyback secondary winding 140, because the auxiliary secondary windings normally deliver very little power, failure to provide these additional inductors will have a much smaller effect on the overall efficiency of the power supply. Thus, insertion of these inductors, while preferred, is a matter of choice.

During the first portion of the switching cycle output of the PWM 10, as flux is stored in the main transformer's core for subsequent conversion into current in the flyback mode secondary winding 140, it is also coupled directly into each of the auxiliary, forward converter mode secondary windings 150 and 160. The actual voltage produced by these auxiliary secondary windings is defined in accordance with the turns ratio coupled to the primary winding 40. The output voltage produced by each of the auxiliary secondary windings will remain at a prescribed constant value (e.g., 12V), irrespective of the voltage produced by the transformer's flyback secondary winding 110, in accordance with the value established by the current detector circuit 100 and output over output lines 116 and 117 to maintain a constant current flow via the two-wire path 110 to the remote load.

The voltage pulses produced by the secondary windings will be transformer ratio-coupled to the primary voltage, and can therefore be controlled to the correct amplitude by properly setting the turns ratios of the transformer windings. The widths of these pulses will be controlled by the amount of power required to be delivered by the secondary flyback winding. Thus, the pulse trains produced by a respective secondary auxiliary winding will be a series of pulses of desired amplitude and of a width having an average value controlled by load conditions. It is necessary that the value of capacitance downstream of rectification diodes be large relative to the loading of the auxiliary windings. As a result, the auxiliary secondary windings 150 and 160 operate in a peak hold mode and are not sensitive to pulse width.

As will be appreciated from the foregoing description, the above discussed problems of conventional flyback mode transformer configured, constant current power supply configurations are effectively remedied in accordance with the present invention, by means of a multimode transformer winding arrangement, which is not only configured to supply constant current power over a two wire link transporting telecommunication signals to a remote telecommunication unit, but is augmented to include auxiliary forward converter mode secondary windings, which are configured to supply a reduced magnitude constant supply voltage for powering the circuitry of the power supply itself, including the switched voltage generator on the primary side of the transformer, and a current detector on the secondary side of the transformer.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. An apparatus for supplying constant current power by way of an electrical link to a load comprising:
    a controlled voltage modulator which is operative to generate a modulated voltage;
    a transformer having an input winding coupled to receive said modulated voltage, a flyback output winding configured for flyback mode operation to deliver a constant current via said electrical link to said load, a first auxiliary output winding configured for forward converter mode operation and coupled to supply a constant voltage for operating said controlled voltage modulator; and
    a detector circuit coupled with said electrical link and being operative to control the operation of said controlled voltage modulator so as to maintain constant current flow via said flyback output winding of said transformer to said load.

2. An apparatus according to claim 1, wherein said transformer further includes a second auxiliary output winding configured for forward converter mode operation and being coupled to supply a voltage for operating said detector circuit.

3. An apparatus according to claim 2, wherein said controlled voltage modulator comprises a pulse width modulator, and wherein said detector circuit is operative to control the duration of pulses generated by said controlled pulse voltage modulator, so as to maintain said constant current flow via said flyback output winding of said transformer to said load.

4. An apparatus according to claim 1, wherein said electrical link comprises a telecommunication link through which telecommunication signals are transported between a central office site and a remote site, and wherein said load comprises a telecommunication device located at said remote site.

5. An apparatus according to claim 2, wherein each of said first and second auxiliary output windings is coupled through a diode and an inductor to said controlled voltage modulator.

6. An apparatus according to claim 2, further including an auxiliary power supply for supplying an initial voltage for operating said controlled voltage modulator until said first auxiliary winding supplies said voltage for operating said controlled voltage modulator.

7. A constant current power supply apparatus for supplying constant current power to a remote telecommunication unit by way of a telecommunication link which transports telecommunication signals between a central office and said remote unit, said apparatus comprising:

a controlled voltage modulator which is operative to modulate a prescribed voltage in accordance with a control signal representative of the effective current supplied to said remote telecommunication unit by way of said telecommunication link;

a detector circuit coupled in circuit with said telecommunication link and being operative to generate an output representative of the effective current supplied to said remote telecommunication unit by way of said telecommunication link; and a transformer having a primary winding coupled to receive the voltage modulated by said controlled voltage modulator, a first secondary winding configured for flyback mode operation and supplying a constant current to said telecommunication link, and a second secondary winding configured for forward converter mode operation and being coupled to supply a voltage for operating said detector circuit.

8. An apparatus according to claim 7, wherein said transformer further includes a third secondary winding configured for forward converter mode operation and being coupled to supply a constant voltage for operating said controlled voltage modulator.

9. An apparatus according to claim 7, wherein said controlled voltage modulator comprises a pulse width modulator, and wherein said detector circuit is operative to control the duration of pulses generated by said controlled pulse voltage modulator, so as to maintain said constant current flow via said first secondary winding through said telecommunication link to said remote unit.

10. An apparatus according to claim 8, wherein each of said second and third secondary windings is coupled through a respective diode and inductor to said detector circuit.

11. An apparatus according to claim 8, further including an auxiliary power supply for supplying an initial voltage for operating said controlled voltage modulator until said third secondary winding supplies said voltage for operating said controlled voltage modulator.

12. A constant current power supply apparatus comprising a multimode transformer winding arrangement having a primary winding coupled to receive a modulated voltage, a constant flyback mode secondary winding, which is configured to supply constant current power from a central office over a telecommunication link transporting telecommunication signals to a remote telecommunication unit, and at least one auxiliary forward converter mode secondary winding, which is configured to supply a reduced magnitude, constant supply voltage for powering internal circuitry of said power supply apparatus.

13. A constant current power supply apparatus according to claim 12, wherein said power supply apparatus includes a controlled voltage modulator which is operative to modulate a prescribed voltage in accordance with a control signal representative of the effective current supplied to said remote telecommunication unit by way of said telecommunication link, and a detector circuit coupled with said telecommunication link and operative to control said controlled voltage modulator so as to maintain constant current flow from said constant current flyback mode secondary winding to said remote telecommunication unit, and wherein said multimode transformer winding arrangement comprises a first auxiliary secondary winding configured for forward converter mode operation and coupled to supply said reduced magnitude, constant voltage to said controlled voltage modulator, and a second auxiliary secondary winding configured for forward converter mode operation and being coupled to supply said reduced magnitude, constant supply voltage to said detector circuit.

14. A method for supplying constant current power to a remote telecommunication unit by way of a telecommunication link which transports telecommunication signals between a central office and said remote unit method comprising the steps of:

(a) generating a control signal representative of the effective current supplied to said remote telecommunication unit by way of said telecommunication link;

(b) modulating a prescribed voltage in accordance with said control signal, so as to generate a modulated voltage;

(c) coupling said modulated voltage generated in step (b) to a primary winding of a transformer having a first, constant current-supplying, flyback secondary winding configured for flyback mode operation, and a second secondary winding;

(d) coupling said first secondary winding of said transformer to said telecommunication link, so as to supply said constant current power to a remote telecommunication unit; and (e) generating said modulated voltage in accordance with forward converter mode operation of said second secondary winding of said transformer.

15. A method according to claim 14, wherein in step (a) said control signal representative of the effective current supplied to said remote telecommunication unit by way of said telecommunication link, is generated in accordance with forward converter mode operation of said second secondary winding of said transformer.

16. A method according to claim 14, wherein said transformer has a third secondary winding, and wherein in step (b) said modulated voltage is generated in accordance with forward converter mode operation of said third secondary winding of said transformer.

17. A method according to claim 14, further comprising a detector circuit which is operative to generate said signal representative of the effective current supplied to said remote telecommunication unit by way of said telecommunication link, and wherein step (e) further comprises enabling said detector circuit in accordance with forward converter mode operation of said second secondary winding of said transformer.

18. A method according to claim 17, wherein each of said second and third secondary windings is coupled through a diode and an inductor to said detector circuit.

19. A method according to claim 14, wherein step (b) comprises controlling the duration of pulses generated by a controlled pulse width modulator, in accordance with said control signal, and wherein step (e) comprises powering controlled pulse voltage modulator, in accordance with forward converter mode operation of said second secondary winding of said transformer.

* * * * *